Feb. 14, 1956  S. W. FERRIS ET AL  2,734,365
WAX COMPOSITION

Filed April 22, 1953  2 Sheets-Sheet 2

INVENTORS.
SEYMOUR W. FERRIS
JOHN D. TENCH
IRL N. DULING, JR.
BY
ATTORNEY

United States Patent Office 2,734,365
Patented Feb. 14, 1956

2,734,365
WAX COMPOSITION

Seymour W. Ferris, Mount Holly, N. J., and John D. Tench, Prospect Park, and Irl N. Duling, Jr., Media, Pa., assignors to Sun Oil Company, Philadelphia, Pa., a corporation of New Jersey Application April 22, 1953, Serial No. 350,451

3 Claims. (Cl. 67—22)

This invention relates to a novel wax composition, and more particularly relates to a solid composition containing paraffin wax, microcrystalline wax and a substantial quantity of oil, said composition being especially suitable for producing long-burning candles such as sanctuary candles.

Although the art of making candles is old and well developed, certain types of candles present problems which have not been satisfactorily solved. For example, candles molded in a casing, such as a glass container, which are designed to burn for a long time with a uniform flame have not heretofore been satisfactory. The composition of such candles must be such that, on burning, no deposit or coating of wax is left on the casing, and the flame must burn so that substantially no soot is observed on the casing. A further requirement is that no flow of the composition be observed when the container is shipped or stored on its side. Paraffin scale wax is usually employed to prepare such candles, but as shown hereinafter, such wax is not satisfactory.

An object of the invention is to provide a wax composition especially suitable for preparing candles enclosed by a casing. A further object is to provide a wax composition which will not flow from an uncovered container when stored on its side at 100° F. Another object is to provide a process for the manufacture of a novel wax composition. A still further object is to provide a new article of manufacture comprising a candle formed from a novel wax composition. Other objects appear hereinafter.

It has now been found that by compounding three separate components prepared from slack wax, all of which have specific properties, the resulting composition is especially suitable for preparing long-burning candles which do not leave a deposit or coating of wax or soot on the sides of a confining casing, particularly a glass container, and that the composition so prepared does not flow from the casing when stored on its side at 100° F. A significant advantage is the long-burning property of candles prepared from the present composition. For example, candles of the present composition burn from 10% to 100% longer than candles of the same size prepared from waxes heretofore used.

Figure 1:
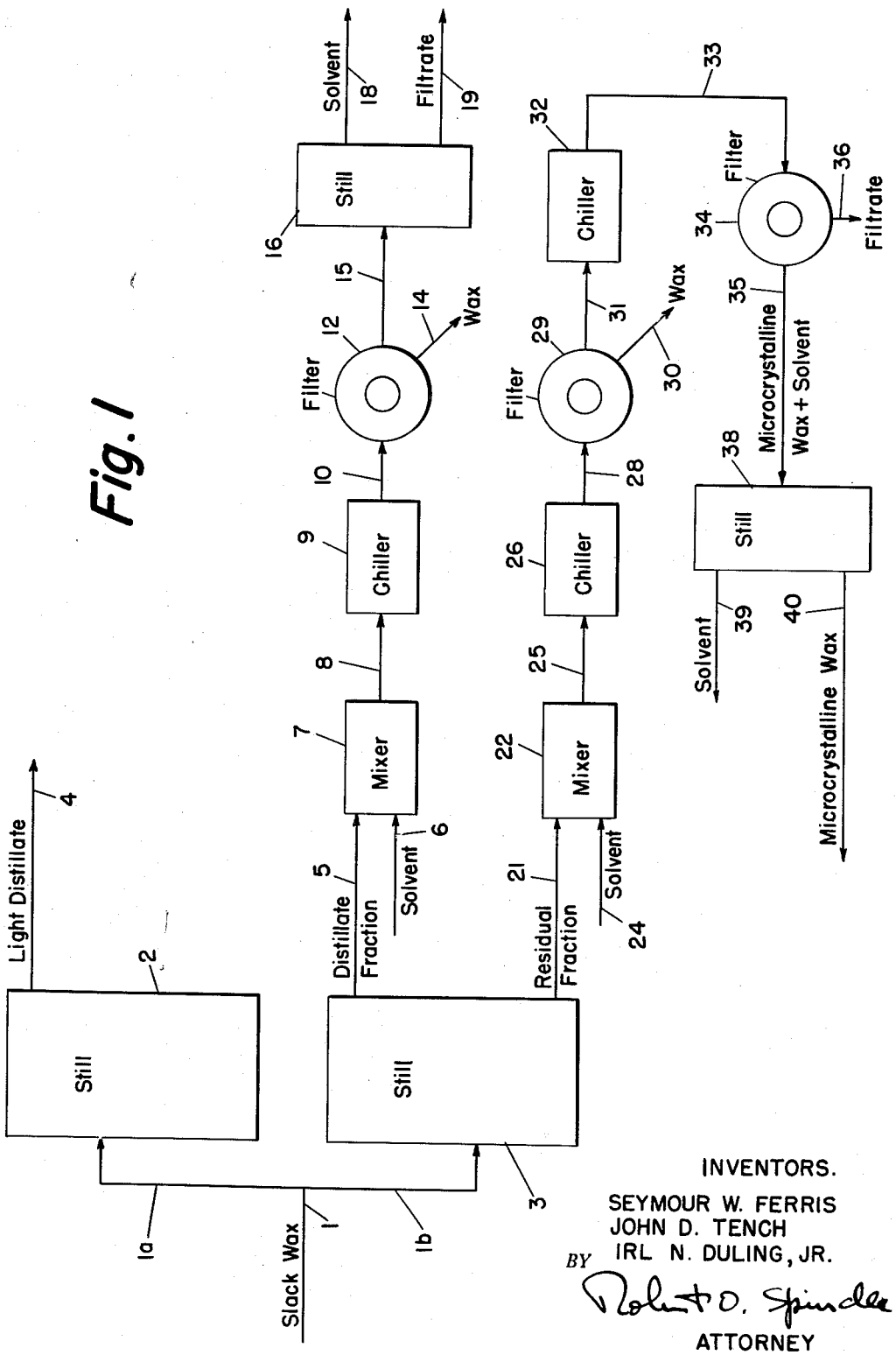
Figure 2:
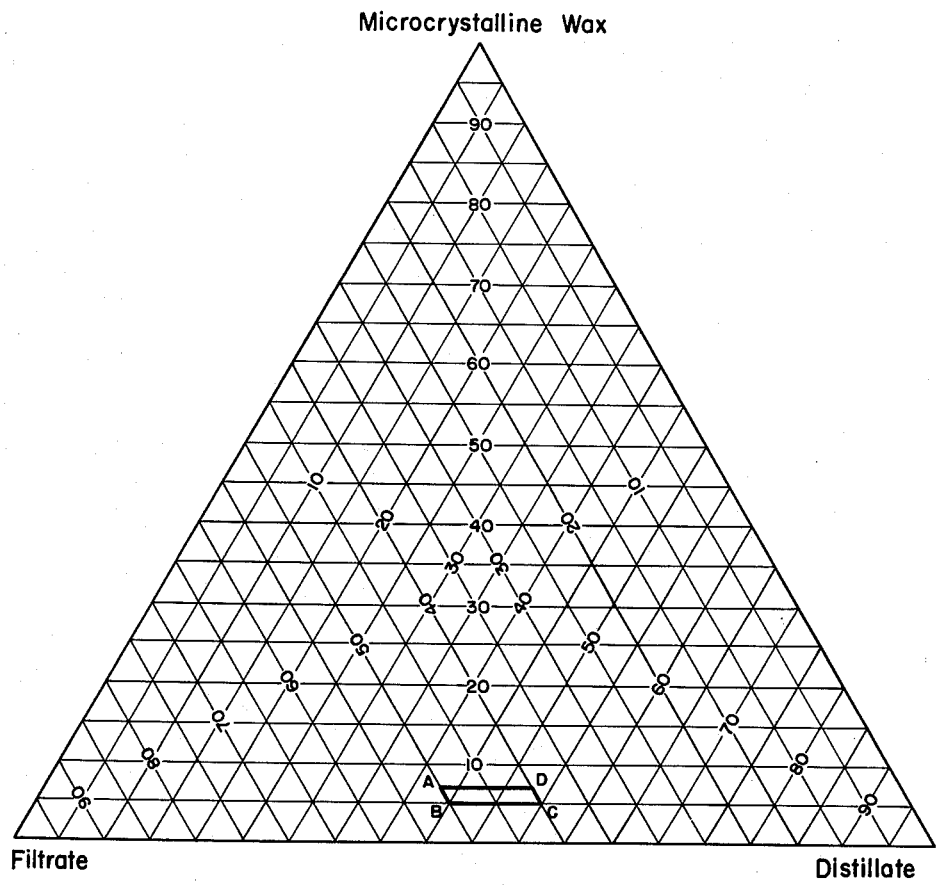

Figure 1 is a flow diagram showing the process for preparing the three components of the present composition and is described in detail hereinafter. Figure 2 is a ternary diagram showing the operable concentrations of the components of the present composition, and is more fully described hereinafter.

As above stated, the three components of the composition are prepared from slack wax. Slack wax is a mixture of crude petroleum wax and oil, formed by separation from waxy oil, and contains from about 10% to 50% oil. One component is a light distillate obtained by the distillation of slack wax, contains from about 20% to 30% oil, and is hereinafter designated "light distillate."

Another component is an admixture of wax and oil obtained as a filtrate from a distillate fraction from slack wax by adding a solvent to the distillate fraction, chilling, and filtering the precipitated wax. The filtrate from this operation, after separation from the solvent, consists of a mixture of wax and oil having a pour point of about 75° F. and forms a component, hereinafter designated "filtrate," of the present composition. The final component is a microcrystalline wax having a melting point of about 150° F., and is prepared from a residual fraction obtained in the distillation of slack wax. The preparation and properties of these components are more fully discussed hereinafter.

The light distillate component is prepared by distilling slack wax and collecting the fraction boiling from 360 to 500° F. at 2 mm. Hg pressure absolute, and preferably boiling from 400 to 480° F. at 2 mm. Hg absolute pressure. This light distillate component has a melting point of from about 110 to 120° F., a viscosity (Saybolt Universal at 210° F.) of about 37, and contains from about 20 to 30% oil.

The filtrate component of the present invention is obtained from the slack wax fraction boiling within the range of from 360° to 580° F. at 2 mm. Hg pressure absolute, and preferably from 400 to 560° F. at 2 mm. Hg pressure absolute. A solvent, such as a mixture of methyl ethyl ketone, benzene and toluene is added to the fraction at an elevated temperature sufficient to obtain complete dissolution, and the resulting solution chilled to a temperature of from 30 to 35° F. thereby precipitating a substantial quantity of wax. The precipitated wax is then separated by filtration. The filtrate so obtained, after separation of the solvent such as by distillation, constitutes the filtrate component of the present composition. The filtrate has a pour point of about 70 to 80° F., and preferably about 75° F., a boiling range of from 360° F. to 580° F. at 2 mm. Hg pressure absolute, and preferably from 400 to 560° F. at 2 mm. Hg pressure absolute, and a viscosity (Saybolt Universal at 210° F.) of about 42 to 48, and preferably about 45. Other solvents which have a preferential solvent power for the oil, which dissolve wax at a relatively high temperatures and precipitate wax at lower temperatures, may be substituted for the preferred methyl ethyl ketone-benzene-toluene solvent, such as a mixture of benzene and methyl ethyl ketone in approximately equal parts by volume, or similar mixtures wherein other ketones such as methyl butyl ketone are employed. Also, other solvents such as ethylene, dichloride, pentane, hexane, and alcohols such as propyl or heptyl alcohols may be employed as components of suitable solvent compositions. With such other solvents, however, it may be necessary to adjust the temperature of precipitation to give about the same yield of wax as is obtained with the preferred solvent.

The final component of the present composition, a microcrystalline wax, is prepared from slack wax by collecting a residual fraction boiling above about 560° F. at 2 mm. Hg pressure absolute, and preferably boiling above 585° F. at 2 mm. Hg pressure absolute. Solvent, as described for the preparation of filtrate, is added to the residual fraction at an elevated temperature to dissolve the wax, and the resulting solution cooled to a temperature of from about 105° F. to 120° F., preferably about 110° F. The precipitated wax is removed by filtration and the filtrate is further cooled to a temperature of from about 45° F. to 55° F., and preferably about 50° F. An additional quantity of wax is precipitated at this lower temperature and is separated by filtration. The so-produced wax constitutes the microcrystalline wax of the present invention and has a melting point of from about 140° F. to 155° F., and preferably about 150° F., a boiling range above about 560° F. at 2 mm. Hg pressure absolute, and a viscosity (Saybolt Universal at 210° F.) of about 70 to 90, and preferably about 82.

Attention is now directed to the accompanying flow diagram which illustrates the method of the present invention for preparing the various components of the novel composition. Slack wax is introduced through lines 1 and 1a into still 2. A light distillate boiling in the range of from 400 to 480° F. at 2 mm. Hg pressure absolute is taken off through line 4. This light distillate, without further treatment, forms a component of the composition. Slack wax is also introduced through lines 1 and 1b to still 3 and a distillate fraction boiling in the range of from 400 to 560° F. at 2 mm. Hg pressure absolute is taken from still 3 through line 5. It will be noted that the boiling range of this fraction includes at least a portion of the boiling range of the light distillate, and hence if a single still is used for distillation the two distillate fractions are not simultaneously recovered. This wider boiling distillate fraction, through line 5, and solvent, through line 6, are introduced into mixer 7, maintained at a temperature above the required for complete dissolution of the fraction in the solvent, usually about 180° F. The solvent is preferably a mixture of methyl ethyl ketone, benzene and toluene. The solution passes through line 8 to chiller 9 wherein the solution is cooled to a temperature of about 33° F. The resulting solution containing precipitated wax passes through line 10 to filter 12, where precipitated wax is separated through line 14. Filtrate and solvent pass through line 15 to still 16, wherein solvent is removed through line 18 and can be recycled in the process. Filtrate is removed from the still through line 19 and forms a component of the composition of the invention.

A residual fraction consisting of the material boiling above about 560° F. at 2 mm. Hg pressure absolute is removed from still 2 through line 21 and passed to mixer 22. Solvent is also introduced into mixer 22 through line 24. Mixer 22 is maintained at a temperature sufficient to achieve complete dissolution of the wax, usually about 195° F. From mixer 22 the solution passes through line 25 to chiller 26, wherein the temperature of the solvent is reduced to about 110° F. The resulting solution containing wax precipitated at this temperature is passed through line 28 to filter 29 wherein the precipitated wax is removed through line 30. The mixture of filtrate and solvent is passed through line 31 to chiller 32, wherein the temperature is further reduced to about 50° F., thereby precipitating an additional quantity of wax. The solution containing precipitated wax is passed through line 33 to filter 34, wherein filtrate and solvent are removed through line 36. Precipitated wax is passed through line 35 to still 38 wherein the microcrystalline wax is separated from any remaining solvent, the microcrystalline wax, a component of the present novel composition, being recovered through line 40 and solvent through line 39.

In the foregoing flow diagram, apparatus and operations which will be apparent to those skilled in the art have been largely omitted in the interest of simplicity. For example, mechanical agitators are advantageously employed in the mixers 7 and 22, and heating means for said mixers may be employed to maintain the proper temperature; chillers 9, 26 and 32 are each advantageously a series of cooled elongated cylindrical tubes fitted with scrapers for removing precipitated wax from the sides thereof; precipitated wax removed by filter 34 is advantageously washed with an additional quantity of solvent supplied at about the temperature of filtration.

The three components are conveniently blended by heating proper proportions thereof, as hereinafter defined, to a temperature above the melting points of the components, preferably to a temperature of from 150° F. to 200° F., and stirring the molten mixture so that on solidification a homogeneous composition is obtained.

The proportions of each of the three components employed to prepare the composition of the present invention are critical. The quantity of light distillate to employ must be within the range of from 43 to 55% by weight; the quantity of filtrate to employ must be within the range of from 40 to 50% by weight; and the quantity of microcrystalline wax to employ must be within the range of from 5 to 7% by weight. The preferred composition with which excellent results are obtained contains 47% light distillate, 47% filtrate and 6% microcrystalline wax. To emphasize the necessity of employing quantities of the wax composition components within the stated ranges, attention is now directed to Fig. 2. This figure is a ternary diagram showing by area ABCD the permissible variations in the concentrations of the three components. If a composition defined by any point outside of area ABCD be employed, the objects of the present invention are defeated. As shown hereinafter by example, variation from the stated ranges demonstrated by area ABCD results in a composition which, when formed into a candle and burned in a glass container, exhibits one or more of the following adverse effects: a wax coating on the glass sides, soot deposition, and flow from the container when stored on its side at 100° F. or less.

The compositions of the present invention have melting points of from about 105 to 115° F., a viscosity (Saybolt Universal at 210° F.) of from about 39 to 43, and a cone penetration (ASTM D-217-52T) of from about 50 to 70. The preferred composition containing 47% light distillate, 47% filtrate and 6% microcrystalline wax has a melting point of 110° F., a viscosity (Saybolt Universal at 210° F.) of 41, and a cone penetration (ASTM D-217-52T) of 61. The wax composition is characterized by its low melting point and resistance to flow from an uncovered glass container filled therewith and laid on its side at 100° F. for 17 hours.

In accordance with the invention, candles are produced from the composition by means heretofore known. For example, a wick can be vertically positioned in about the center of a glass container and the subject wax composition in molten form poured therein. Solidification of the composition forms the article of manufacture of the invention. Casings other than glass, such as synthetic organic plastic, may be employed, but glass containers are preferred. The casing can be a true cylinder or a cylinder modified by inclined walls.

The selection of a wick is important but is within the scope of those skilled in the art. In the present candle, it is preferred to employ as the wick a wire made of low-melting metal or plastic wrapped with cotton yarn. After supporting wax has been melted by the candle flame, the wire maintain the wick in an upright position so that it does not bend over and become extinguished in the molten wax.

The wax composition of the present invention is also useful for purposes other than candle manufacture, such as a base material for protective skin coatings.

*Example*

Various blends of light distillate, filtrate and microcrystalline wax were prepared, made into candles contained in glass casings, and tested by burning.

The light distillate was prepared by distilling slack wax and collecting the fraction boiling from 360 to 500° F. at 2 mm. Hg pressure absolute. The light distillate had a melting point of about 110° F., a viscosity (Saybolt Universal at 210° F.) of 37, and contained about 25% oil.

The filtrate was prepared by distilling slack wax and collecting the fraction boiling from 400 to 560° F. at 2 mm. Hg pressure absolute. The fraction was dissolved at an elevated temperature in a solvent consisting of 60% by volume methyl ethyl ketone, 25% by volume benzene and 15% by volume toluene. The resulting solution was chilled to 33° F. and the precipitated wax separated by filtering. Solvent was separated from the filtrate by distillation to prepare the filtrate component. The filtrate had a pour point of 75° F. and a viscosity (Saybolt Universal at 210° F.) of 45.

The microcrystalline wax was prepared by distilling slack wax and collecting a residual fraction boiling above 585° F. at 2 mm. Hg pressure absolute. The wax was dissolved, at an elevated temperature, in the same solvent as described for the filtrate. The resulting solution was cooled to 110° F. and the precipitated wax separated by filtration. The filtrate was then further cooled to 50° F. and the precipitated wax separated by distillation. This microcrystalline wax, after removal of solvent, had a melting point of 150° F. and a viscosity (Saybolt Universal at 210° F.) of 82.

Candles were prepared by combining various proportions of the three components, heating to above the melting points, and stirring to obtain a homogeneous blend. The molten composition was poured into a glass jar having a diameter of about 3 inches and a height of about 8.8 inches. A wick consisting of cotton yarn on a plastic core was vertically positioned through the jar before filling with the molten composition, so that on solidification a candle contained in the glass jar was formed. The wax compositions were then tested by igniting the wick and observing the burning characteristics, and also by storing the candles on their side at 100° F. or as otherwise indicated for 17 hours to observe any flow.

The blends employed and results obtained are given in the following table, in which "parts" refer to parts by weight, "wax coating" means the coating of wax left on the surface of the jar as the candle was consumed and "soot" refers to deposition thereof on the inner surface of the jar.

| Light distillate (Parts) | Filtrate (Parts) | Microcrystalline Wax (Parts) | Results |
| --- | --- | --- | --- |
| 47 | 47 | 6 | No wax coating or soot; no flow at 100° F. |
| 46.25 | 46.25 | 7.5 | Wax coating and soot observed. |
| 75 | 20 | 5 | Wax coating. |
| 48 | 48 | 4 | Flowed at 95° F. |
| 38 | 57 | 5 | Wax coating; flowed at 95° F. |
| 45 | 45 | 10 | Heavy wax coating. |
| 30 | 60 | 10 | Do. |
| 20 | 75 | 5 | Wax coating. |
| 30 | 65 | 5 | Wax coating; flowed at 95° F. |

The candle prepared in accordance with the present invention burned 14 days before the wax was consumed. The other compositions were consumed within 5 to 10 days.

As above indicated, individual waxes are not satisfactory. For example, a scale wax having a melting point of about 125° F. was tested and found to leave a heavy wax coating and a deposit of soot.

The invention claimed is:

1. A new composition of matter comprising from 43 to 55 parts of a slack wax distillate boiling within the range of from about 360° F. to 500° F. at 2 mm. Hg pressure absolute and having a melting point of from about 110° F. to 120° F.; from 40 to 50 parts of a slack wax distillate fraction filtrate boiling within the range of from about 360° F. to 580° F. at 2 mm. Hg pressure absolute and having a pour point of from about 70° F. to 80° F. and a Saybolt Universal viscosity at 210° F. of about 42 to 48; and from 5 to 7 parts of a microcrystalline wax having a melting point of from about 140° F. to about 155° F. and having a Saybolt Universal viscosity at 210° F. of from about 70 to 90.

2. A new article of manufacture comprising a candle prepared by the composition of claim 1.

3. Process for the preparation of a wax composition which comprises: (A) distilling slack wax and collecting a distillate fraction boiling from about 360° F. to 500° F. at 2 mm. Hg pressure absolute; (B) distilling slack wax and collecting a distillate fraction boiling from about 360° F. to 580° F. at 2 mm. Hg pressure absolute, dissolving the distillate fraction at an elevated temperature in a solvent therefor, cooling the solution to a temperature of from about 30° F. to 35° F. whereby a quantity of wax is precipitated, separating the precipitated wax and removing solvent from the resulting filtrate; (C) distilling slack wax and collecting a residual fraction boiling above about 560° F. at 2 mm. Hg pressure absolute, dissolving the residual fraction at an elevated temperature in a solvent therefor, cooling the solution to a temperature of from about 105° F. to 120° F. whereby a quantity of wax is precipitated, separating the precipitated wax from the solution, further cooling the solution to a temperature of from about 45° F. to 55° F. whereby a quantity of microcrystalline wax is precipitated, and separating the last mentioned precipitated microcrystalline wax; (D) heating from 43 to 55 parts of distillate prepared by (A), from 40 to 50 parts of the filtrate prepared by (B) and from 5 to 7 parts of microcrystalline wax prepared by (C) to form a molten admixture thereof, and agitating said molten admixture to prepare a uniform composition.

References Cited in the file of this patent

UNITED STATES PATENTS

| | | |
| --- | --- | --- |
| 1,902,489 | Clark | Mar. 21, 1933 |
| 1,920,161 | Rosen | July 25, 1933 |
| 1,937,518 | Henderson et al. | Dec. 5, 1933 |
| 2,611,734 | Ridenour | Sept. 23, 1952 |
| 2,661,318 | MacLaren et al. | Dec. 1, 1953 |

OTHER REFERENCES

Warth: "The Chemistry and Technology of Waxes," pp. 360–364 (1947), published by Reinhold Publishing Corp., New York, N. Y.